(12) United States Patent
Jensen (10) Patent No.: US 8,793,103 B2
(45) Date of Patent: Jul. 29, 2014

(54) METHOD AND SYSTEM FOR DETECTION OF MACHINE OPERATION STATE FOR MONITORING PURPOSES

(75) Inventor: Raymond Verle Jensen, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 498 days.

(21) Appl. No.: 12/956,456

(22) Filed: Nov. 30, 2010

(65) Prior Publication Data

US 2012/0136627 A1      May 31, 2012

(51) Int. Cl.
*G06F 11/30*      (2006.01)

(52) U.S. Cl.
USPC .......................................................... 702/182

(58) Field of Classification Search
USPC ................ 702/57, 58, 64, 182, 183, 188, 189
See application file for complete search history.

(56) References Cited

U.S. PATENT DOCUMENTS

| | | | |
|---|---|---|---|
| 5,610,339 A * | 3/1997 | Haseley et al. | ................. 73/660 |
| 2010/0049377 A1* | 2/2010 | Scheid et al. | ..................... 701/3 |
| 2010/0063777 A1 | 3/2010 | Berkcan et al. | |

* cited by examiner

*Primary Examiner* — Mohamed Charioui
(74) *Attorney, Agent, or Firm* — Fletcher Yoder P.C.

(57) ABSTRACT

Embodiments of the invention described herein use an output of an energy harvester as an indication of the operating state of the machine, device, or process the energy harvester is associated with. In one aspect, a system is described. The system is comprised of at least one of a machine or process, a processor, and an energy harvesting device associated with the machine or process. The processor is configured to use an output of the energy harvesting device created by the machine or process to determine whether the machine or process is in a first operating state or a second operating state.

16 Claims, 5 Drawing Sheets

Receive an Output from an Energy Harvesting Device Associated with a Machine or Process
202

Determine an Operational State of the Machine or Process from the Output
204

Correlate Output Signals from a Monitoring System Associated with the Machine or Process with the Operational State of the Machine or Process
206

METHOD AND SYSTEM FOR DETECTION OF MACHINE OPERATION STATE FOR MONITORING PURPOSES

BACKGROUND OF THE INVENTION

In many instances, machines such as for example electric motors, electric generators, internal-combustion engines, jet engines, turbines, and the like, the systems they drive, and processes are actively monitored by various monitoring systems for performance and operational characteristics including for example vibration, heat, noise, electrical characteristics (e.g., current, voltage, resistance, etc.), environmental effects, process parameters and the like. Generally, the monitoring systems that monitor these machines and processes are comprised of one or more transducers that are proximate to and associated with the machine or process. The monitoring systems can also include components for signal processing, alarming and display, which may be combined into one device or located in separate components. Recently, wireless transducers are being used in these monitoring systems to facilitate installation and reduce wiring "congestion." Currently, in some instances wireless transducer systems periodically "wake up" and take one or more readings on some parameter associated with the machine or process with which they are associated. When the sensor wakes up, it is generally done so on a time or periodic basis and in some instances the machine or process may not be running when the sensor becomes active. At worst, capturing monitoring data during times of non-operation of the machine or process can lead to an alarm because the sensor reading is not what is expected, or at least can cause waste of the storage space for the data since if it is not taken while the machine or process is not running then it may not have any value.

Often data from these types of monitoring systems is provided to an automated system that performs rudimentary data analysis without operator interference. The ability for these automated systems to know the operating state of the machine or process when the data was collected can be very useful to insure data comparisons are under similar operating conditions. Not knowing the operating state of the machine or process when the data was collected can also lead to confusion in data analysis because the viewer of the data has no way of knowing (in many cases) the operating state of the machine or process when the data was collected.

Previous attempts to address this issue include utilizing a keyphasor or other direct measurement of rotor speed of the machine. While this is a completely robust and well understood solution to defining when a machine is in operation, it is also very expensive because it involves a great deal of installation effort plus the cost of the extra transducer and wiring necessary to power that transducer. Additionally, there have been some efforts to identify the operation mode of machinery by recognizing the signature present in vibration or other signals associated with the motors. While these methods work in some instances, there exists the possibility of false positives and vibration signatures may not be present on smoothly operating machines.

Therefore, systems and methods that overcome challenges in the art, some of which are described above, are desired. In particular, providing a sure indication of machine or process status would be valuable in addressing the above-described challenges.

BRIEF DESCRIPTION OF THE INVENTION

Embodiments of the invention described herein use an output of an energy harvester as an indication of an operating state of a machine, device, or process the energy harvester is associated with, wherein the operating state can be indicative of a speed of the machine or whether the machine is stopped, running, running forward, running in reverse, etc.

In one aspect, a system is described. The system is comprised of at least one of a machine or process, a processor, and an energy harvesting device associated with the machine or process that creates an output from the machine or process. The processor is configured to use the output of the energy harvesting device created by the machine or process to determine an operating state of the machine or process.

In another aspect, a system is described that is comprised of a machine, a processor, a machine monitoring system, and an energy harvesting device associated with the machine that creates an output from the machine. The output of the energy harvesting device is used by the processor to determine an operating state of the machine. One or more outputs of the machine monitoring system are correlated with the determined operating state of the machine as determined by the output of the energy harvesting device.

In yet another aspect, a method is described. The method comprises receiving an output from an energy harvesting device associated with at least one of a machine or process. The output is created by the machine or process and is used to determine an operating state of the machine. Further comprising the method is receiving one or more outputs from a machine monitoring system associated with the machine, and correlating, by a processor, the one or more outputs of the machine monitoring system with the determined operating state of the machine as determined by the output of the energy harvesting device.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF THE INVENTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. Further, when examples of ranges are provided herein, it is to be appreciated that the given ranges also include all subranges therebetween, unless specifically stated otherwise.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As described herein, embodiments of the invention comprise the use of an output of an energy harvester as an indication of the operating state of a machine, device, or process the energy harvester is associated with. While energy harvesters have been used for the powering of sensors on rotating equipment such as electric motors, the sensors (and their associated monitoring system) typically do not have an indication of the operating state of the machine or process when the sensors make measurements. Therefore, the technical effect of the described embodiments is to provide the operational status of the machine or process when measurements are made to a monitoring system.

Several power harvesting techniques directly rely on the operation of an associated machine or process. For example, power harvesting can be performed on an electric motor based on air flow from built-in cooling fans, the flow of process fluids, rotation of the shaft, current flow, thermal differentials, vibration activity, and the like. Power harvesting technology that can be used in various embodiments of the invention includes piezoelectric devices, pyroelectric and thermoelectric devices, micro wind turbines, electrostatic devices, kinetic devices, vibrational devices, and the like as are known to one of ordinary skill in the art.

Most, but not all, energy harvesting methods by their nature harvest energy from the machinery to which they are associated during the times when those machines are in operation. For example, vibration energy harvesters power systems by converting mechanical energy present in the vibrations to electrical energy. The vibration utilized is caused by the rotation of the shaft(s) in the machinery (thus, the machine is in a running operating state). This aspect of the energy harvesting methodologies in use means that whenever the harvesting system is producing energy or providing power, or providing power at or above a defined threshold (i.e., providing an output), then the machine is in a running operating state. Information about the output of an energy harvester can be passed along with other data and information in a network such as a wireless monitoring network for indication if the data is being taken on a running machine or not. A simple power detection circuit or element can be used to detect when the energy produced, for example, current flow (or voltage level) from the harvesting device is above a threshold, which can then be used to change the status of a switch or digital register. The switch status or digital register is then used by other systems (e.g., a monitoring system) to indicate the machine's operational status.

Figure 1:
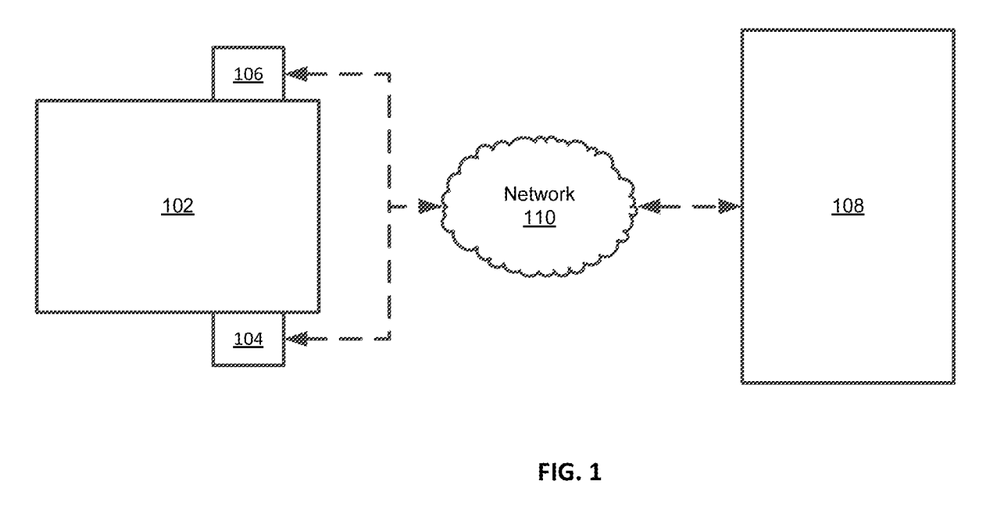
FIG. 1 is block diagram of one embodiment of a system according to the present invention.

FIG. 1 is block diagram of one embodiment of a system according to the present invention. The exemplary system is comprised of a machine 102. For example, the machine 102 can be an electric motor, an electric generator, an internal-combustion engine, a jet engine, a turbine, and the like. In one aspect, the machine 102 can be used in a process such as, for example, a manufacturing process. Further comprising the embodiment of a system is an energy harvesting device 104 associated with the machine 102. The energy harvesting device 104 can be for example a piezoelectric device, a pyroelectric device, a thermoelectric device, a micro wind turbine, an electrostatic device, a kinetic device, a vibrational device, and the like, as are known to one of ordinary skill in the art. In one aspect, the energy harvesting device 104 is attached to the machine 102. In another aspect, the energy harvesting device 104 is proximate to the machine 102. In one aspect, the energy harvesting device 104 can be associated with a process that comprises the machine 102. For example, the energy harvesting device 104 can be a thermal energy harvesting device and be associated with a liquid that is heated or mixed by the machine 102. The energy harvesting device 104 is selected such that it provides an output in accordance with an operating state of the machine 102 or process. For example, if the machine 102 were an electric motor, then the energy harvesting device 104 can be vibrational energy harvesting device that produces energy from the vibrations caused by the rotor of the electric motor, or the energy harvesting device 104 can be a micro wind turbine that produces energy from the cooling air flow of the motor or motion of the process fluid as in a ventilation fan, or the energy harvesting device 104 can be a electrostatic device that produces energy from the magnetic field created by the motor or the current in the power feed to the motor. The output or output signal produced by the energy harvesting device 104 can be for example a voltage output, a current output, amplitude, frequency or any energy produced or power output by the energy harvesting device 104 or any measurement thereof. In one aspect, if the output exceeds a predefined threshold, this can be an indication that the associated machine 102 is in a specific operating state (i.e., running, running at or above a certain speed, running in a forward direction, running in a reverse direction, etc.). Similarly, if the output is less than a predefined threshold, this can also be an indication of the operating state of the associated machine 102 (i.e., not running, running below a certain speed, etc.). For example, in one instance power detection circuit or element as known to one of ordinary skill in the art can be used to detect when the energy produced (e.g., current flow, voltage level, etc.) from the harvesting device is above a threshold, which can then be used to change the status of a switch or digital register. Alternatively, values that decrease when the machine 102 is in an operating state can be used to signal the operational state of the machine 102. Furthermore, determination of the operating state can be based on content of the output as well as a threshold. For example, the operating state can be based on the presence (or absence) of a certain frequency in the output.

Figure 3:
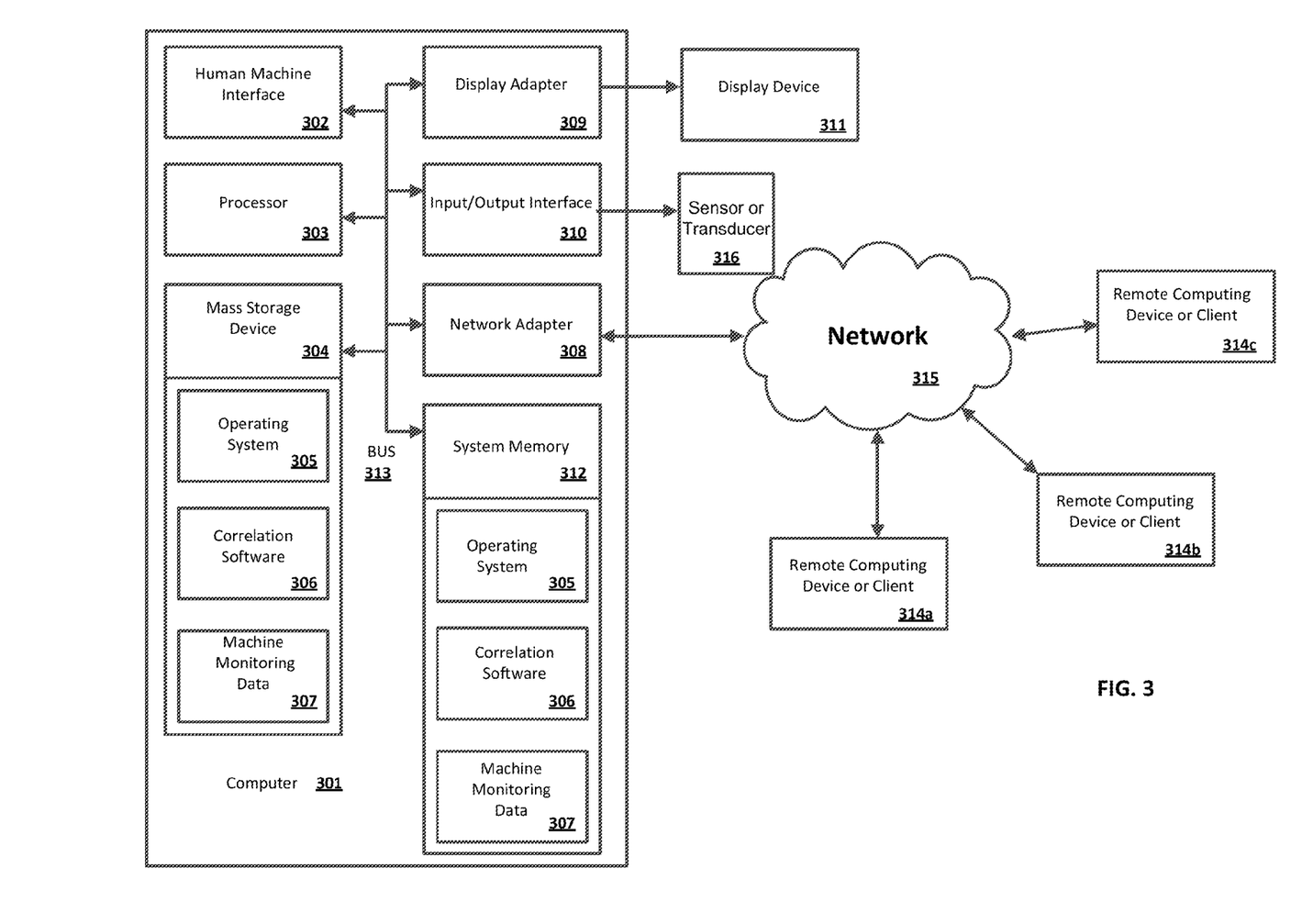
FIG. 3 is a block diagram illustrating an exemplary operating environment for performing the disclosed methods.

Further comprising the embodiment of a system shown in FIG. 1 is a monitoring system 106. A monitoring system 106 can be for example a condition monitoring system, a vibration monitoring system, a thermal monitoring system, a noise monitoring system, an electrical parameters monitoring system, a performance monitoring system, an environmental monitoring system, and the like. Furthermore, the monitoring system 106 can be for process measurements such as flows, temperatures, steam quality, humidity of the process itself, and the like. Such systems are available from, for example, General Electric Company (Schenectady, N.Y.), and The Timken Company (Canton, Ohio), among others. Transducers and sensors that comprise the monitoring system 106 provide one or more outputs about various conditions of the machine 102 or process. In some instances, transducers or sensors of such systems 106 do not constantly monitor the associated machine 102 or process. In some instances, the monitoring systems wake up and monitor the machine or process on a time or periodic basis. For example, the transducers may be programmed to take a reading every five minutes, every fifteen minutes, every hour, etc. In other instances, the transducers may be configured to wake up and take a reading at 8:00 a.m., 8:30 a.m., 9:00 a.m., etc. Generally, such readings are provided to a processor 108 through a network 110. In various instances, the network 110 can be wired, wireless or a combination of wired and wireless. In one aspect, the processor 108 is part of a computer, as described in more detail herein. Similarly, the energy harvesting device 104 can provide its output signal to the processor 108 through the network 110. In some instances, the monitoring system 106 does not have an indication of the operating state of the machine 102 or process when the transducers and sensors that comprise the system 106 take their readings. Therefore, in one aspect, the one or more outputs of the monitoring system 106 can be correlated by the processor 108 with the operating state of the machine 102 or process as determined by the output of the energy harvesting device 104. In one aspect, the processor 108 correlating the one or more outputs of the monitoring system 106 with the operating state of the machine 102 or process as determined by the output of the energy harvesting device 104 comprises the processor 108 determining whether the one or more outputs of the monitoring system 106 were produced during a time period that the machine 102 or process was in a running operating state or during a time period that the machine 102 or process was in the non-running operating state as determined by the output of the energy harvesting device 104. Examples of operating states that can be determined include stopped, running, running at or above a certain speed, running in a forward direction, running in a reverse direction, and the like.

Figure 2:
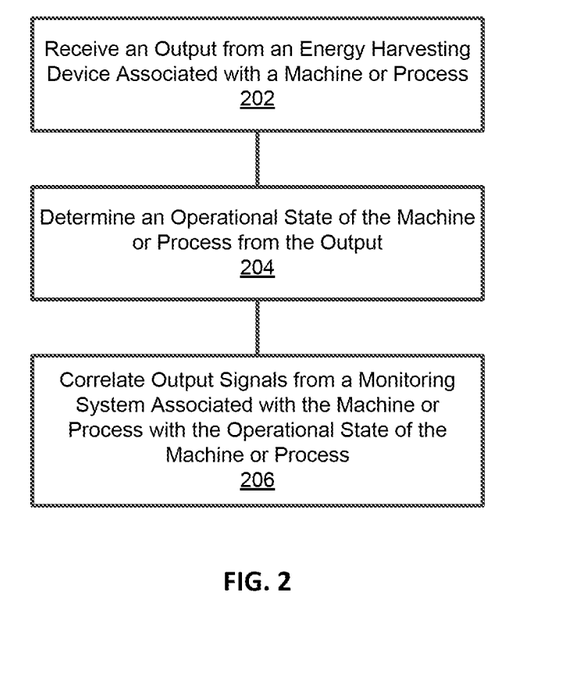
FIG. 2 is a flowchart illustrating a method of practicing an embodiment of the present invention.

FIG. 2 is a flowchart illustrating a method of practicing an embodiment of the present invention. At step 202, an output is received from an energy harvesting device associated with a machine or process. The output of the energy harvesting device is created by the associated machine or process. For example, the power harvesting device can create an output from an electric motor based on air flow from built-in cooling fans, the flow of process fluids, rotation of the shaft, current flow, thermal differentials, vibration activity, and the like. At step 204, the output from the energy harvesting device is used to determine the operating state of the machine or process. For example, if the value of the output is below a threshold value, then the machine can be in a stopped or slow-speed state. If the value of the output is at or above the threshold value, then the machine or process can be in a running or full-speed state. Alternatively, if the value of the output is below a threshold value, then the machine or process can be in a running operating state, and if the value of the output is at or above the threshold value, then the machine or process can be in a stopped operating state. At step 206, one or more outputs from a machine monitoring system associated with the machine are correlated with the operating state of the machine or process as determined by the output of the energy harvesting device. Therefore, an operating state of the machine or process can be determined when the one or more outputs from the monitoring system were produced.

The above system has been described above as comprised of units (e.g., the monitoring system 106, the network 110, etc.). One skilled in the art will appreciate that this is a functional description and that software, hardware, or a combination of software and hardware can perform the respective functions. A unit, such as the monitoring system 106 and the network 110 can be software, hardware, or a combination of software and hardware. The units can comprise the correlation software 306 as illustrated in FIG. 3 and described below. In one exemplary aspect, the units can comprise a computer 301 as illustrated in FIG. 3 and described below.

FIG. 3 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise machine monitoring systems, programmable consumer electronics, network PCs, minicomputers, mainframe computers, smart meters, smart-grid components, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 301. The components of the computer 301 can comprise, but are not limited to, one or more processors or processing units 303, a system memory 312, and a system bus 313 that couples various system components including the processor 303 to the system memory 312. In the case of multiple processing units 303, the system can utilize parallel computing.

The system bus 313 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 313, and all buses specified in this description can also be implemented over a wired or wireless network connection and each of the subsystems, including the processor 303, a mass storage device 304, an operating system 305, correlation software 306, monitoring data 307, a network adapter 308, system memory 312, an Input/Output Interface 310, a display adapter 309, a display device 311, and a human machine interface 302, can be contained within one or more remote computing devices or clients 314a,b,c at physically separate locations, connected through buses of this form, in effect implementing a fully distributed system or distributed architecture.

The computer 301 typically comprises a variety of computer readable media. Exemplary readable media can be any available media that is non-transitory and accessible by the computer 301 and comprises, for example and not meant to be limiting, both volatile and non-volatile media, removable and non-removable media. The system memory 312 comprises computer readable media in the form of volatile memory, such as random access memory (RAM), and/or non-volatile memory, such as read only memory (ROM). The system memory 312 typically contains data such as monitoring data 307 and/or program modules such as operating system 305 and appliance update software 306 that are immediately accessible to and/or are presently operated on by the processing unit 303.

In another aspect, the computer 301 can also comprise other non-transitory, removable/non-removable, volatile/non-volatile computer storage media. By way of example, FIG. 3 illustrates a mass storage device 304 that can provide non-volatile storage of computer code, computer readable instructions, data structures, program modules, and other data for the computer 301. For example and not meant to be limiting, a mass storage device 304 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 304, including by way of example, an operating system 305 and appliance update software 306. Each of the operating system 305 and correlation software 306 (or some combination thereof) can comprise elements of the programming and the correlation software 1006. Monitoring data 307 can also be stored on the mass storage device 304. Monitoring data 307 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 301 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 303 via a human machine interface 302 that is coupled to the system bus 313, but can be connected by other interface and bus structures, such as a parallel port, game port, an IEEE 1394 Port (also known as a Firewire port), a serial port, or a universal serial bus (USB).

In yet another aspect, a display device 311 can also be connected to the system bus 313 via an interface, such as a display adapter 309. It is contemplated that the computer 301 can have more than one display adapter 309 and the computer 301 can have more than one display device 311. For example, a display device can be a monitor, an LCD (Liquid Crystal Display), or a projector. In addition to the display device 311, other output peripheral devices can comprise components such as speakers (not shown) and a printer (not shown), which can be connected to the computer 301 via Input/Output Interface 310. Further comprising components that can be connected to the computer 301 through the Input/Output Interface 310 or by other means includes sensors or transducers 316 such as for example vibration sensors, heat sensors, and the like. Any step and/or result of the methods can be output in any form to an output device. Such output can be any form of visual representation, including, but not limited to, textual, graphical, animation, audio, tactile, and the like.

The computer 301 can operate in a networked environment using logical connections to one or more remote computing devices or clients 314a,b,c. By way of example, a remote computing device 314 can be a personal computer, portable computer, a server, a router, a network computer, a smart meter, a vendor or manufacture's computing device, smart grid components, a peer device or other common network node, and so on. Logical connections between the computer 301 and a remote computing device or client 314a,b,c can be made via a local area network (LAN) and a general wide area network (WAN). Such network connections can be through a network adapter 308. A network adapter 308 can be implemented in both wired and wireless environments. Such networking environments are conventional and commonplace in offices, enterprise-wide computer networks, intranets, and other networks 315 such as the Internet.

For purposes of illustration, application programs and other executable program components such as the operating system 305 are illustrated herein as discrete blocks, although it is recognized that such programs and components reside at various times in different storage components of the computing device 301, and are executed by the data processor(s) of the computer. An implementation of correlation software 306 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

The following examples are put forth so as to provide those of ordinary skill in the art with a complete disclosure and description of how the systems, articles, devices and/or methods claimed herein are made and evaluated, and are intended to be purely exemplary and are not intended to limit the scope of the methods and systems. Efforts have been made to ensure accuracy with respect to numbers, but some errors and deviations should be accounted for.

Figure 4:
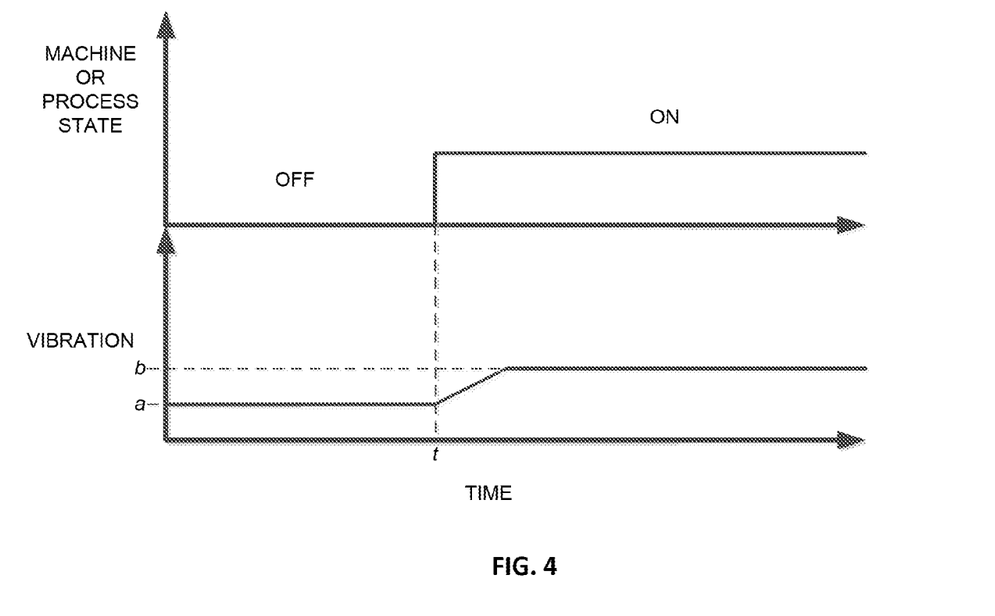
FIGS. 4, 5 and 6 are exemplary graphs that illustrate selection criteria that can be used to select an energy harvesting device for a machine according to an aspect of the present invention.
Figure 5:
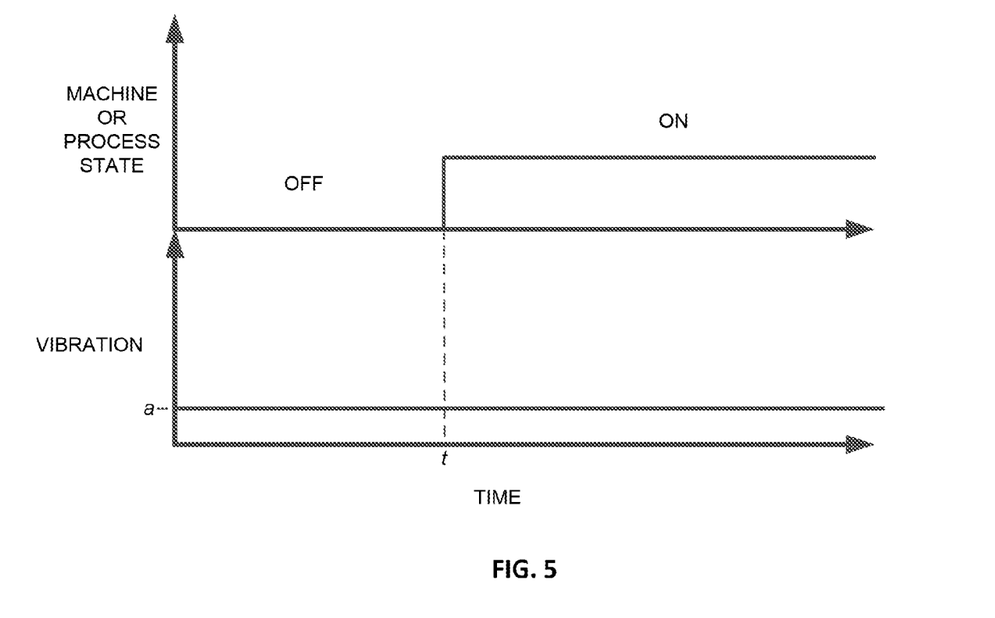
Figure 6:
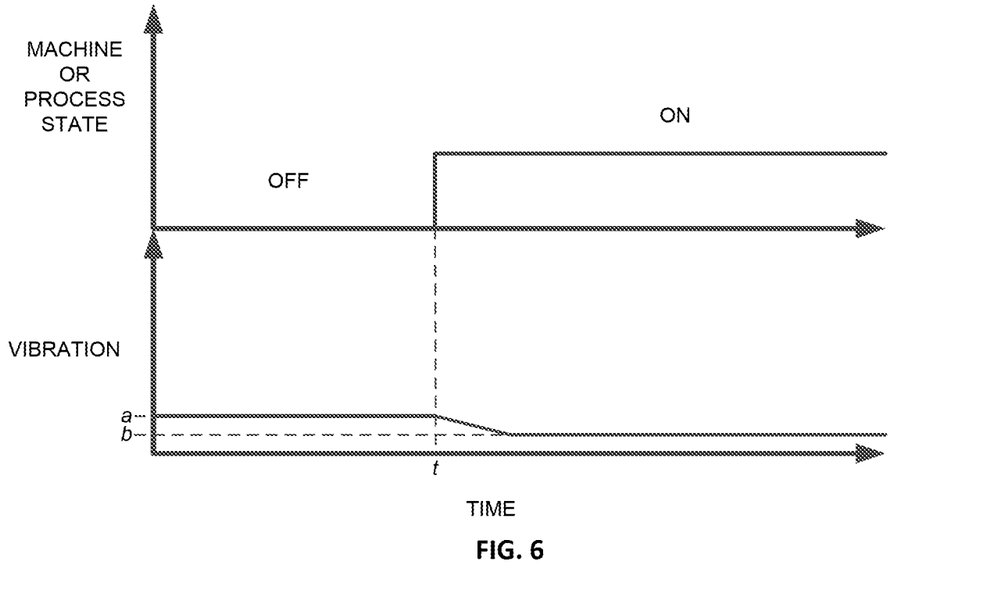

FIGS. 4, 5 and 6 are exemplary graphs that illustrate selection criteria that can be used to select an energy harvesting device for a machine or process according to an aspect of the present invention.

FIG. 4 illustrates exemplary graphs for determining whether a vibrational-type energy harvesting device can be used to determine the operational state of an associated machine or process. The upper graph as shown in FIG. 4 shows the operational state of the associated machine or process. As shown, the machine or process is in an "off" operating state until time t. After time t, the machine or process is in an "on" operating state. While the machine or process is in the "off" operating state, a certain amount, a, of vibration is recorded, as shown in the lower graph of FIG. 4. The vibration while the machine or process is in an "off" operating state can be caused by, for example, ambient vibration from other machines operating in the proximity of the machine or process being monitored. After time t (i.e., after the machine or process is in an "on" operating state), the vibration increases to level b. Therefore, in this instance, a vibrational-type energy harvesting device can be used to determine whether the machine or process is in an operating or non-operating state. The threshold for the energy harvesting device can be set at a signal level (i.e., energy produced) that would be produced by the device at vibration level b, or at a level between a and b.

FIG. 5 is another illustration of exemplary graphs for determining whether a vibrational-type energy harvesting device can be used to determine the operational state of an associated machine or process. The upper graph as shown in FIG. 5 shows the operational state of the associated machine or process. As shown, the machine or process is in an "off" operating state until time t. After time t, the machine or process is in an "on" operating state. While the machine or process is in the "off" operating state, a certain amount, a, of vibration is recorded, as shown in the lower graph of FIG. 5. The vibration while the machine or process is in an "off" operating state can be caused by, for example, ambient vibration from other machines operating in the proximity of the machine or process being monitored. After time t (i.e., after the machine or process is in an "on" operating state), the vibration stays the same as it was before time t. This can be caused by a very smooth operating machine or process, or by the machine or process having vibration that is out of phase with the ambient vibration thereby having a dampening effect on the total vibration. Therefore, in this instance, a vibrational-type energy harvesting device should not be used to determine the operating state of the machine or process is in an "on" operating state or an "off" operating state.

FIG. 6 is yet another illustration of exemplary graphs for determining whether a vibrational-type energy harvesting device can be used to determine the operational state of an associated machine or process. The upper graph as shown in FIG. 6 shows the operational state of the associated machine or process. As shown, the machine or process is in an "off" operating state until time t. After time t, the machine or process is in an "on" operating state. While the machine or process is in the "off" operating state, a certain amount, a, of vibration is recorded, as shown in the lower graph of FIG. 6. The vibration while the machine is in the "off" operating state can be caused by, for example, ambient vibration from other machines or processes operating in the proximity of the machine or process being monitored. After time t (i.e., after the machine is in an "on" operating state), the vibration decreases from level a to level b. This can be caused by, for example, the machine or process having vibration that is out of phase with the ambient vibration thereby having a dampening effect on the total vibration. Therefore, in this instance, a vibrational-type energy harvesting device can be used to determine whether the machine or process is in an "on" operating state or an "off" operating state. In other words, the threshold for the energy harvesting device can be set at a signal level that would be produced by the device when total vibration decreased to vibration level b, or to a level between a and b.

As described above and as will be appreciated by one skilled in the art, embodiments of the present invention may be configured as a system, method, or computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the one or more processors 303 discussed above with reference to FIG. 3, to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus (e.g., one or more processors 303 of FIG. 3) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system, comprising:
   a processor;
   an energy harvesting device configured to harvest an energy from a machine or process and generate an output, wherein the processor is configured to use the output of the energy harvesting device to determine an operating state of the machine or process; and
   a monitoring system configured to monitor the machine or process, wherein the processor is configured to correlate one or more outputs of the monitoring system with the operating state of the machine or process as determined by the output of the energy harvesting device, wherein the processor is configured to determine whether the one or more outputs of the monitoring system were produced during a first time period that the machine or process was in a first operating state or during a second time period that the machine or process was in a second operating state as determined by the output of the energy harvesting device.

2. The system of claim 1, wherein the monitoring system includes a condition monitoring system, a vibration monitoring system, a thermal monitoring system, a noise monitoring system, an electrical parameters monitoring system, a performance monitoring system, an environmental monitoring system, or a process monitoring system, or any combination thereof.

3. The system of claim 1, wherein the energy harvesting device comprises a piezoelectric device, a pyroelectric device, a thermoelectric device, a micro wind turbine, an electrostatic device, a kinetic device, or a vibrational device, or any combination thereof.

4. The system of claim 1, wherein the at least one machine or process comprises an electric motor, an electric generator, an internal-combustion engine, a jet engine, or a turbine, or any combination thereof.

5. The system of claim 1, wherein the output of the energy harvesting device used to determine the operating state of the machine or process comprises a voltage output.

6. The system of claim 1, wherein the output of the energy harvesting device used to determine the operating state of the machine or process comprises a current output.

7. The system of claim 1, wherein the energy harvesting device is configured to harvest the energy to generate power to operate one or more devices of the system.

8. The system of claim 1, wherein the energy harvesting device comprises a thermal energy harvester, or a fluid flow energy harvester configured to harvest the energy from a fluid flow, or a combination thereof.

9. A method comprising:
   receiving an output from an energy harvesting device associated with at least one of a machine or process, wherein the energy harvesting device is configured to harvest an energy from the machine or process, and the output is used to determine an operating state of the machine or process;
   receiving one or more outputs from a monitoring system associated with the machine or process; and
   correlating, by a processor, the one or more outputs of the monitoring system with the operating state of the machine or process as determined by the output of the energy harvesting device, wherein correlating comprises determining whether the one or more outputs of the monitoring system were produced during a first time period that the machine or process was in a first operating state or during a second time period that the machine or process was in a second operating state as determined by the output of the energy harvesting device.

10. The method of claim 9, wherein the monitoring system comprises one or more of a condition monitoring system, a vibration monitoring system, a thermal monitoring system, a noise monitoring system, an electrical parameters monitoring system, a performance monitoring system, an environmental monitoring system, or a process monitoring system, or any combination thereof.

11. The method of claim 9, wherein the energy harvesting device comprises a piezoelectric device, a pyroelectric device, a thermoelectric device, a micro wind turbine, an electrostatic device, a kinetic device, or a vibrational device, or any combination thereof.

12. The method of claim 9, wherein the machine comprises an electric motor, an electric generator, an internal-combustion engine, a jet engine, or a turbine, or any combination thereof.

13. The method of claim 9, wherein the output used to determine the operating state of the machine or process comprises a voltage output.

14. The method of claim 9, wherein the output used to determine the operating state of the machine or process comprises a current output.

15. A system, comprising:
a machine;
a processor;
a monitoring system configured to monitor the machine and
an energy harvesting device configured to harvest an energy from the machine and generate an output, wherein the processor is configured to use the output of the energy harvesting device to determine an operating state of the machine, and one or more outputs of the monitoring system are correlated with the operating state of the machine as determined by the output of the energy harvesting device, wherein the processor is configured to determine whether the one or more outputs of the monitoring system were produced during a first time period that the machine was in a first operating state or during a second time period that the machine was in a second operating state as determined by the output of the energy harvesting device.

16. The system of claim 15, wherein the energy harvesting device is configured to harvest the energy to generate power to operate one or more devices of the system.

* * * * *

UNITED STATES PATENT AND TRADEMARK OFFICE
CERTIFICATE OF CORRECTION

| | | |
|---|---|---|
| PATENT NO. | : 8,793,103 B2 | Page 1 of 1 |
| APPLICATION NO. | : 12/956456 | |
| DATED | : July 29, 2014 | |
| INVENTOR(S) | : Jensen | |

It is certified that error appears in the above-identified patent and that said Letters Patent is hereby corrected as shown below:

Claims

In Column 14, Line 4, in Claim 15, delete "machine" and insert -- machine; --, therefor.

Signed and Sealed this
Twenty-fourth Day of November, 2015

Michelle K. Lee
*Director of the United States Patent and Trademark Office*